United States Patent Office 3,159,622
Patented Dec. 1, 1964

3,159,622
17α-(2-CARBOXYETHYL)-17β-HYDROXY-6-NITRO-
ANDROST-4-EN-3-ONE γ-LACTONES
Robert B. Garland, Northbrook, Ill., assignor to G. D.
Searle & Co., Chicago, Ill., a corporation of Delaware
No Drawing. Filed Mar. 22, 1963, Ser. No. 267,353
2 Claims. (Cl. 260—239.57)

This invention relates to 17α-(2-carboxyethyl)-17β-hydroxy-6-nitroandrost-4-en-3-one γ-lactones and processes for the manufacture thereof. More particularly, this invention provides new and useful chemical compounds of the formula

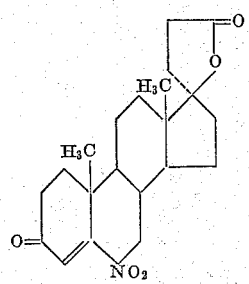

wherein the nitro substituent at carbon atom number 6 can be in either α or β configuration.

Equivalent to the foregoing lactones for the purposes of this invention are corresponding hydroxy acids and their alkali salts of the formula

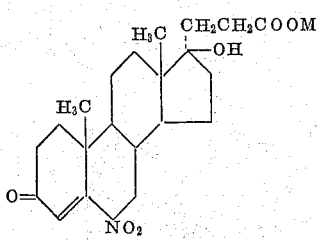

wherein M represents hydrogen, an alkali metal, or the ammonium radical.

The compounds to which this invention relates are useful by reason of their valuable pharmacological properties. Thus, for example, they block the effect of desoxycorticosterone acetate (DCA) on urinary sodium and potassium and are antibiotics variously adapted to inhibit cotyledenous seed germination and the growth of bacteria such as *Diplococcus pneumoniae*. Their anti-DCA activity is particularly unexpected in view of prior art disclosures that the introduction of 6-nitro substituents sometimes totally destroys the characteristic hormonal activity of the material thus modified [Bowers et al.; J. Amer. Chem. Soc., 81, 3702 (1959)].

The 6β-nitro compound derives from the reaction of 3β-acetoxy-17α-(2-carboxyethyl)androst - 5 - en-17β-ol-γ-lactone with nitric acid in a cold ethereal medium to give 3β-acetoxy-17α-(2-carboxyethyl) - 6 - nitroandrost-5-en-17β-ol γ-lactone, which is saponified with aqueous methanolic potassium hydroxide to give 17α-(2-carboxyethyl)-6-nitroandrost - 5 - en-3β,17β-diol γ-lactone. The latter compound is oxidized to 17α-(2-carboxyethyl)-17β-hydroxy - 6β - nitroandrost-4-en-3-one γ - lactone with cold aqueous acetonic chromium trioxide. The 6α - nitro epimer is obtained by dissolving 17α-(2-carboxyethyl)-17β-hydroxy-6β-nitroandrost - 4 - en - 3 - one γ-lactone in methanolic potassium hydroxide at room temperature and allowing the solution to stand briefly.

Those skilled in the art will appreciate that the salts set forth above readily devolve from the corresponding lactones on contact with aqueous alkali, and the free acids are obtained from the salts by a critically brief exposure to a proton source. Prolongation of the exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are at 26° in chloroform solution and refer to the D line of sodium.

EXAMPLE 1

(A) *3β-acetoxy-17α - (2-carboxyethyl)androst - 5-en-17β-ol γ-lactone.*—To a solution of 96 parts of 17α-(2-carboxyethyl)androst-5-ene-3β,17β-diol γ-lactone (U.S. 2,705,712) in 245 parts of pyridine is added 108 parts of acetic anhydride. The resultant mixture is allowed to stand at room temperatures overnight, then diluted with 2500 parts of water and chilled. Insoluble solids are filtered off, washed with water, dried in air, and recrystallized from methanol to give 3β-acetoxy-17α-(2-carboxyethyl)androst-5-en-17β-ol γ-lactone melting at 181–183°.

(B) *3β - acetoxy-17α-(2-carboxyethyl)-6-nitroandrost-5-en-17-ol γ-lactone.*—To a suspension of 11 parts of 3β-acetoxy-17α-(2 - carboxyethyl)androst-5-en-17β-ol γ-lactone in 410 parts of anhydrous ether at between −5 and 0° is slowly added, with agitation, 450 parts of fuming nitric acid. The resultant mixture is maintained at 0±5° for 2 hours, then allowed to warm slowly to 15°, at which temperature 600 parts of aqueous 5% potassium bicarbonate is introduced. The mixture thus obtained is diluted with 280 parts of ether, whereupon the ether phase is separated, the aqueous phase extracted with 280 parts more ether, and the ether extract combined with the ethereal phase previously separated. The resultant ether solution is successively washed with 200-part portions of aqueous 5% sodium bicarbonate until the aqueous phase involved just darkens, whereupon the ether solution is washed with saturated aqueous sodium chloride and dried over anhydrous sodium sulfate. Solvent is thereupon removed by distillation and the residue chromatographed on silica gel, using benzene and ethyl acetate as developing solvents. From an eluate comprising 10% ethyl acetate in benzene, upon removal of solvent by vacuum distillation, 3β-acetoxy-17α-(2-carboxyethyl)-6-nitroandrost-5-en-17β-ol γ-lactone is obtained as the residue.

(C) *17α-(2-carboxyethyl)-6-nitroandrost-5-ene-3β,17β-diol γ-lactone.*—To a solution of 11 parts of 3β-acetoxy-17α-(2-carboxyethyl)-6-nitroandrost-5-en-17β-ol γ-lactone in 160 parts of methanol is added a solution of 10 parts of potassium hydroxide in 100 parts of water. The resultant mixture is heated to the boiling point under reflux in a nitrogen atmosphere with agitation for 1 hour, then diluted with 200 parts of water. The mixture thus obtained is acidified with 40 parts of acetic acid and chilled. The supernatant is decanted and the gummy reside taken up in dichloromethane. The dichloromethane solution, dried over magnesium sulfate and stripped of solvent by vacuum distillation, affords 17α-(2-carboxyethyl)-6-nitroandrost-5-ene-3β,17β-diol γ-lactone.

(D) *17α - (2-carboxyethyl) - 17β-hydroxy-6β-nitroandrost-4-en-3-one γ-lactone.*—An excess of an 8 N solution of 267 parts of chromium trioxide in a mixture of 425 parts of concentrated sulfuric acid with water q.s. is cautiously added, with vigorous agitation at 0°, to a solution of 10 parts of 17α-(2-carboxyethyl)-6-nitroandrost-5- ene-3β,17β-diol γ-lactone in 80 parts of acetone. The resultant mixture is maintained at 0° for 2 minutes, then diluted with 300 parts of water. Insoluble solids are filtered off, washed with water, and recrystallized from a mixture of acetone and hexane to give 17α-(2-carboxyethyl) - 17β - hydroxy - 6β - nitroandrost - 4 - en - 3-one γ-lactone melting at 202–206° and having a specific rotation of −126°. The product has the formula

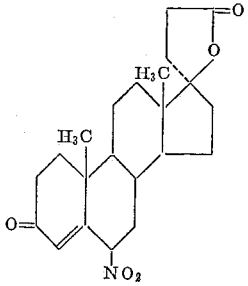

EXAMPLE 2

*17α - (2-carboxyethyl)-17β-hydroxy-6α-nitroandrost-4-en-3-one γ-lactone.*—Approximately 17 parts of 17α-(2-carboxyethyl)-17β-hydroxy-6β-nitroandrost-4-en-3-one γ-lactone is dissolved in a solution of 2 parts of potassium hydroxide and 800 parts of methanol. The solution is allowed to stand at room temperature for 2 minutes, then acidified with acetic acid, treated with decolorizing charcoal, and filtered. The filtrate is diluted with approximately 3 volumes of water and chilled. The gummy solid which precipitates is isolated by filtration, washed with water, and recrystallized from aqueous acetone to give 17α - (2-carboxyethyl)-17β-hydroxy-6α-nitroandrost-4-en-3-one γ-lactone melting at 121–124° and with a specific rotation of +13°. The product has the formula

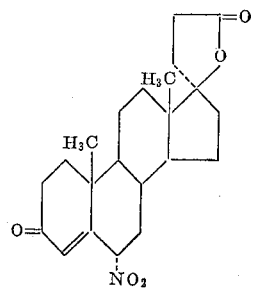

What is claimed is:
1. 17α - (2-carboxyethyl)-17β-hydroxy-6β-nitroandrost-4-en-3-one γ-lactone.
2. 17α - (2-carboxyethyl)-17β-hydroxy-6α-nitroandrost-4-en-3-one γ-lactone.

References Cited in the file of this patent
UNITED STATES PATENTS
2,705,712     Cella _____ Apr. 5, 1955
OTHER REFERENCES
Bowers et al.: "J.A.C.S.," vol. 81, No. 14 (1959) pages 3707–3710.